(12) United States Patent
Azadet et al.

(10) Patent No.: US 8,856,401 B2
(45) Date of Patent: Oct. 7, 2014

(54) UNIVERSAL CONTROLLER FOR PERIPHERAL DEVICES IN A COMPUTING SYSTEM

(75) Inventors: Kameran Azadet, Morganville, NJ (US); Thomas Truman, Red Bank, NJ (US)

(73) Assignee: LSI Corporation, San Jose, CA (US)

( * ) Notice: Subject to any disclaimer, the term of this patent is extended or adjusted under 35 U.S.C. 154(b) by 771 days.

(21) Appl. No.: 10/880,331

(22) Filed: Jun. 29, 2004

(65) Prior Publication Data

US 2005/0114581 A1 May 26, 2005

Related U.S. Application Data

(60) Provisional application No. 60/525,229, filed on Nov. 25, 2003.

(51) Int. Cl.
*H04J 3/16* (2006.01)
*G06F 15/16* (2006.01)
*G06F 13/40* (2006.01)
*H04L 29/06* (2006.01)

(52) U.S. Cl.
CPC .............. *G06F 13/4022* (2013.01); *H04L 69/14* (2013.01)
USPC .............. 710/36; 370/465; 709/250; 709/230

(58) Field of Classification Search
CPC ............................ H04L 69/14; G06F 13/4022
USPC .......... 710/8, 305, 11, 63, 315; 370/463, 469, 370/465; 709/250, 230
See application file for complete search history.

(56) References Cited

U.S. PATENT DOCUMENTS

| | | | |
|---|---|---|---|
| 6,065,073 A * | 5/2000 | Booth | 710/46 |
| 6,141,719 A | 10/2000 | Rafferty et al. | 710/131 |
| 6,226,700 B1 | 5/2001 | Wandler et al. | 710/101 |
| 6,324,605 B1 | 11/2001 | Rafferty et al. | |
| 6,363,439 B1 | 3/2002 | Battles et al. | 710/36 |
| 6,385,211 B1 * | 5/2002 | Williams et al. | 370/469 |
| 6,421,735 B1 * | 7/2002 | Jung et al. | 709/250 |
| 6,549,960 B1 * | 4/2003 | Allison et al. | 710/29 |

(Continued)

FOREIGN PATENT DOCUMENTS

| | | |
|---|---|---|
| JP | 11-308218 A | 11/1999 |
| JP | 2003-143352 A | 5/2003 |
| WO | WO 01/59565 A2 | 8/2001 |

OTHER PUBLICATIONS

Fuller, S., "RapidIO Und PCI Express," Communications Serial Bus Systems, vol. 52, No. 5, pp. 76-80 (Mar. 4, 2003).

(Continued)

*Primary Examiner* — Ernest Unelus

(57) ABSTRACT

An integrated controller is provided for controlling communications with a plurality of peripheral devices. The integrated controller includes a bus interface for processing communications with a processor; a switch for routing communications between the processor and one or more of the peripheral devices; and a plurality of controllers, where each of the controllers provide an interface to at least one peripheral device. The controllers include at least one PHY controller for a corresponding peripheral device that provides an electrical interface to a connection, such as a network connection. The controllers also include at least one MAC controller that stores and forwards packets to and from a network connection.

26 Claims, 3 Drawing Sheets

(56) References Cited

U.S. PATENT DOCUMENTS

| | | | |
|---|---|---|---|
| 6,647,438 B1* | 11/2003 | Connor et al. | 710/22 |
| 6,701,406 B1* | 3/2004 | Chang et al. | 710/310 |
| 6,785,751 B1* | 8/2004 | Connor | 710/52 |
| 6,922,548 B1* | 7/2005 | Moore et al. | 455/41.2 |
| 6,947,438 B1* | 9/2005 | Chang et al. | 370/419 |
| 7,065,582 B1* | 6/2006 | Dwork et al. | 709/234 |
| 7,167,923 B2* | 1/2007 | Lo | 709/245 |
| 7,535,913 B2* | 5/2009 | Minami et al. | 370/401 |
| 7,835,371 B2* | 11/2010 | Krischer et al. | 370/401 |
| 8,073,002 B2* | 12/2011 | Minami et al. | 370/463 |
| 2001/0037397 A1* | 11/2001 | Boucher et al. | 709/230 |
| 2001/0039600 A1* | 11/2001 | Brooks et al. | 710/126 |
| 2001/0042147 A1 | 11/2001 | Adams et al. | 710/100 |
| 2002/0053927 A1 | 5/2002 | Stevens | |
| 2002/0146014 A1* | 10/2002 | Karlsson et al. | 370/395.6 |
| 2002/0165947 A1* | 11/2002 | Akerman et al. | 709/223 |
| 2002/0181055 A1* | 12/2002 | Christiansen et al. | 359/159 |
| 2003/0205995 A1 | 11/2003 | Odaohhara et al. | |
| 2003/0208652 A1* | 11/2003 | Kuhlmann et al. | 710/305 |
| 2003/0221026 A1* | 11/2003 | Newman | 710/8 |
| 2004/0054689 A1* | 3/2004 | Salmonsen et al. | 707/104.1 |
| 2005/0108696 A1* | 5/2005 | Dai et al. | 717/151 |
| 2005/0114554 A1* | 5/2005 | Azadet et al. | 710/1 |
| 2011/0286338 A1* | 11/2011 | Gonda | 370/241.1 |

OTHER PUBLICATIONS

Mayhew et al., "PCT Express and Advanced Switching: Evolutionary Path to Building Next Generation Interconnects," Proceedings of the 11$^{th}$ Symposium on High Performance Interconnects, pp. 21-29 (Aug. 20-22, 2003).

"PCI-Express," Wikipedia, The Free Encyclopedia, http://en.wikipedia.org/wiki/Pci-express, Downloaded on Jan. 30, 2007.

"PCI Express—An Overview of the PCI Express Standard," National Instruments, NI Developer Zone, http://zone.ni.com/devzone/cda/tut/p/id/3767, Downloaded on Jan. 30, 2007.

* cited by examiner ary Patent Application Ser. No. 60/525,929, filed Nov. 25, 2003, incorporated by reference herein.

UNIVERSAL CONTROLLER FOR PERIPHERAL DEVICES IN A COMPUTING SYSTEM

CROSS-REFERENCE TO RELATED APPLICATIONS

The present application claims priority to U.S. Provisional Patent Application Ser. No. 60/525,929, filed Nov. 25, 2003, incorporated by reference herein.

FIELD OF THE INVENTION

The present invention relates generally to computing devices and, more particularly, to methods and apparatus for controlling peripheral devices.

BACKGROUND OF THE INVENTION

Computing systems include a number of internal and external components and devices that must communicate and operate in compatible manner order to perform the functions of the computing device. A typical computing environment includes components and devices manufactured by various manufacturers Bridge logic devices are often employed to provide connectivity between the various devices in a computing system. FIG. 1 is a schematic block diagram of the architecture of an exemplary conventional computing system 100. As shown in FIG. 1, a typical architecture includes a processor (CPU) 110 coupled to a bridge logic device 130 via a bus 115, such as a CPU bus. The bridge logic device 130 is often referred to as a "North" bridge because it is typically depicted at the top of computer system drawings. The North bridge 130 is also coupled to a memory 120 via a bus 125, such as a memory bus, and to one or more graphics devices 140, via a bus 135.

A second bridge logic device 150, typically referred to as a "South" bridge, is typically used to provide a standard interface to a number of peripheral devices and other devices. The South bridge 150 permits manufacturers of peripheral devices to provide devices that are compatible with computer systems of other manufacturers. The South bridge 150 aggregates communications between the various peripheral devices and the processor 110. As shown in FIG. 1, a peripheral device can be connected to the computer system 100 via one or more connectors 170-n to a corresponding physical interface (PHY) 160-1 through 160-N or one or more PCI slots 180, in a well-known manner.

Supporting the peripheral devices in the manner shown in FIG. 1 significantly contributes to the overall system cost of a computing system 100. For example, the costs of implementing the architecture 100 of FIG. 1 includes the costs of the South bridge 150, as well as multiple PHY interfaces 160 or Media Access Controller (MAC)/PHY devices for various peripheral devices, such as network cards, modems and Universal Serial Bus (USB 2.0) devices.

Communications between the South bridge 150 and the North bridge 130 are often over a parallel Peripheral Component Interconnect (PCI) bus. The shared nature of the PCI bus, however, requires that only one peripheral device can communicate on the bus at a time. Further, as additional devices are connected to the PCI bus, additional wires and routing are required. Thus, the PCI bus architecture of the South bridge is generally not scaleable as the number of connected peripheral devices increases.

A need therefore exists for a more cost effective architecture for controlling and communicating with peripheral devices. A further need exists for an integrated controller that is scaleable as the number of connected peripheral devices increases.

SUMMARY OF THE INVENTION

Generally, an integrated controller is provided for controlling communications with a plurality of peripheral devices. The integrated controller includes a bus interface for processing communications with a processor; a switch for routing communications between the processor and one or more of the peripheral devices; and a plurality of controllers, where each of the controllers provide an interface to at least one peripheral device. The controllers include at least one PHY controller for a corresponding peripheral device that provides an electrical interface to a connection, such as a network connection. The controllers also include at least one MAC controller that stores and forwards packets to and from a network connection.

A more complete understanding of the present invention, as well as further features and advantages of the present invention, will be obtained by reference to the following detailed description and drawings.

DETAILED DESCRIPTION

The present invention recognizes that System on a Chip (SoC) technology permits a number of devices to be integrated on a single chip to reduce overall system cost. The present invention also recognizes that such SoC techniques can be employed to provide a universal peripheral controller 300 that improves the reliability and reduces the cost of supporting peripheral devices in a computing system, such as the computing system 100 of FIG. 1.

Figure 1:
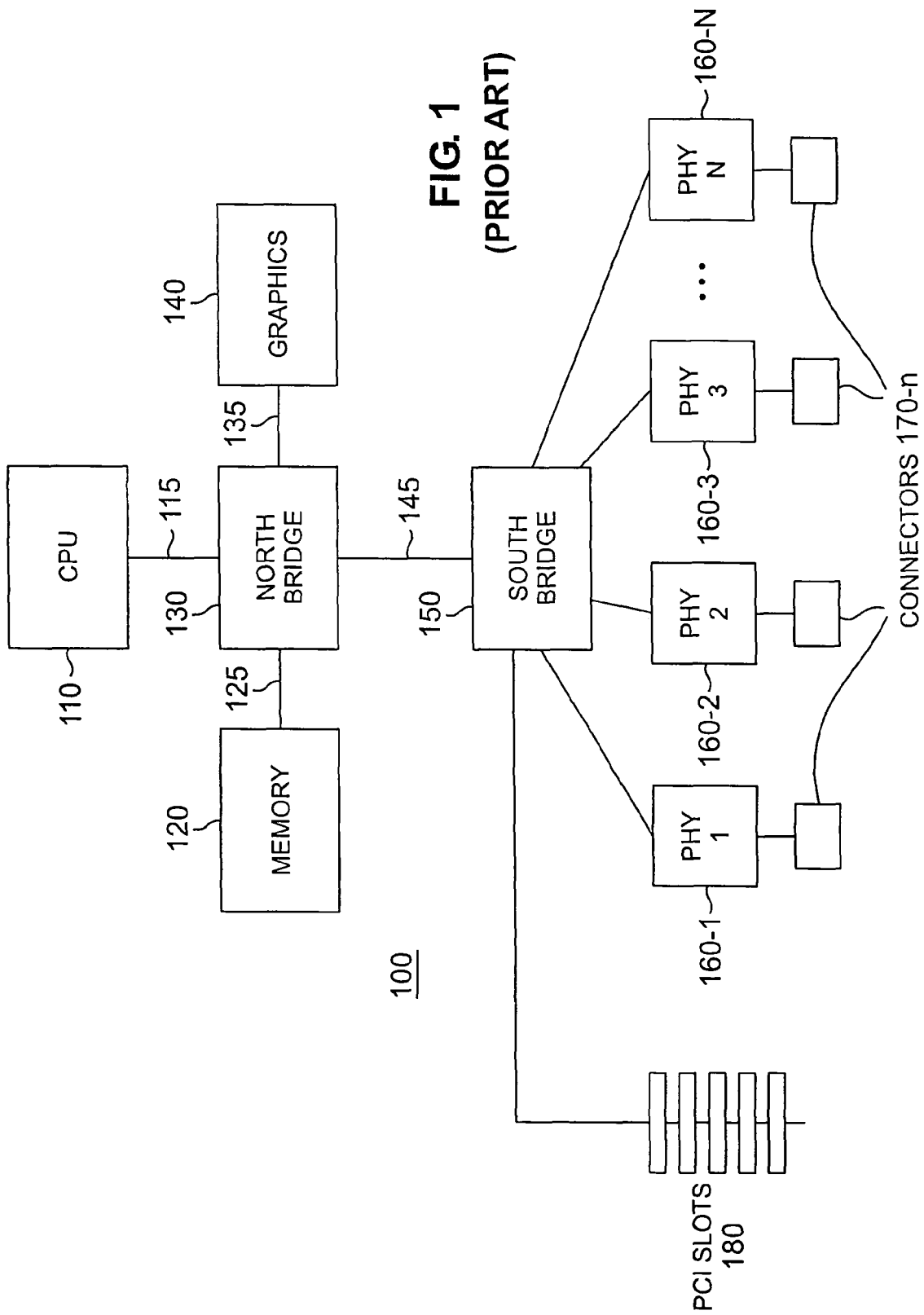
FIG. 1 is a schematic block diagram of the architecture of an exemplary conventional computing system.

In the conventional architecture 100 shown in FIG. 1, the South bridge 150 must provide a switching function to coordinate the communications with the various peripheral devices (not shown), as well as a PHY layer interface (not shown) for each peripheral connection. Similarly, each peripheral connector 170 must have another associated PHY interface 160 (or MAC/PHY device). As discussed hereinafter, the universal peripheral controller 300 of the present invention integrates the components that support the peripheral devices. For example, as discussed further below in conjunction with FIG. 3, the universal peripheral controller 300 provides an interface to the North bridge 130 (or a similar device) and includes the MAC/PHY interfaces for communicating with the peripheral devices, all integrated on a single integrated circuit (IC). In this manner, the universal peripheral controller 300 eliminates the need for translation among different proprietary protocols and redundant PHY interfaces for each peripheral device, as required by the conventional architecture 100 of FIG. 1. In addition, the universal peripheral controller 300 demonstrates reduced complexity, cost and power consumption, relative to the conventional architecture 100.

In one exemplary implementation, the universal peripheral controller 300 employs a PCI-Express bus architecture. For a detailed discussion of the PCI-Express bus architecture, see, for example, www.pcisig.com, incorporated by reference herein. Generally, the PCI-Express bus architecture can be scaled as the number of peripheral devices increases. In addition, the PCI-Express bus provides for serial communications at a high speed, thus allowing for a smaller connector with a reduced number of pins. The original PCI specification defined a 32-bit PCI bus that operated at 33 MHz with a peak throughput of 132 Megabytes/second. Until recently, the performance of the original PCI specification was adequate for most applications. As the processing rates of commercially available processors have increased, the processing capacity of the processors to process data eventually exceeded the capacity of the PCI bus to deliver data. Thus, recent processors can process data faster than the PCI bus can deliver the data to processor.

An updated version of the PCI specification, referred to as PCI Express, proposes to improve the computer performance by increasing the flow of data between a processor and various peripheral devices, such as network cards, printers and storage disks. Rather than transmitting data on a parallel bus, which limits the maximum transmitting speed, PCI-Express uses high speed serial lanes at 2.5 Gbit/second or higher to transmit the data. When multiple lanes are used, e.g., 32 lanes, the maximum speed can be up to 80 Gbit/second. In addition, PCI-Express includes a number of new features that are said to improve reliability, timing and scalability of the bus.

Figure 2:
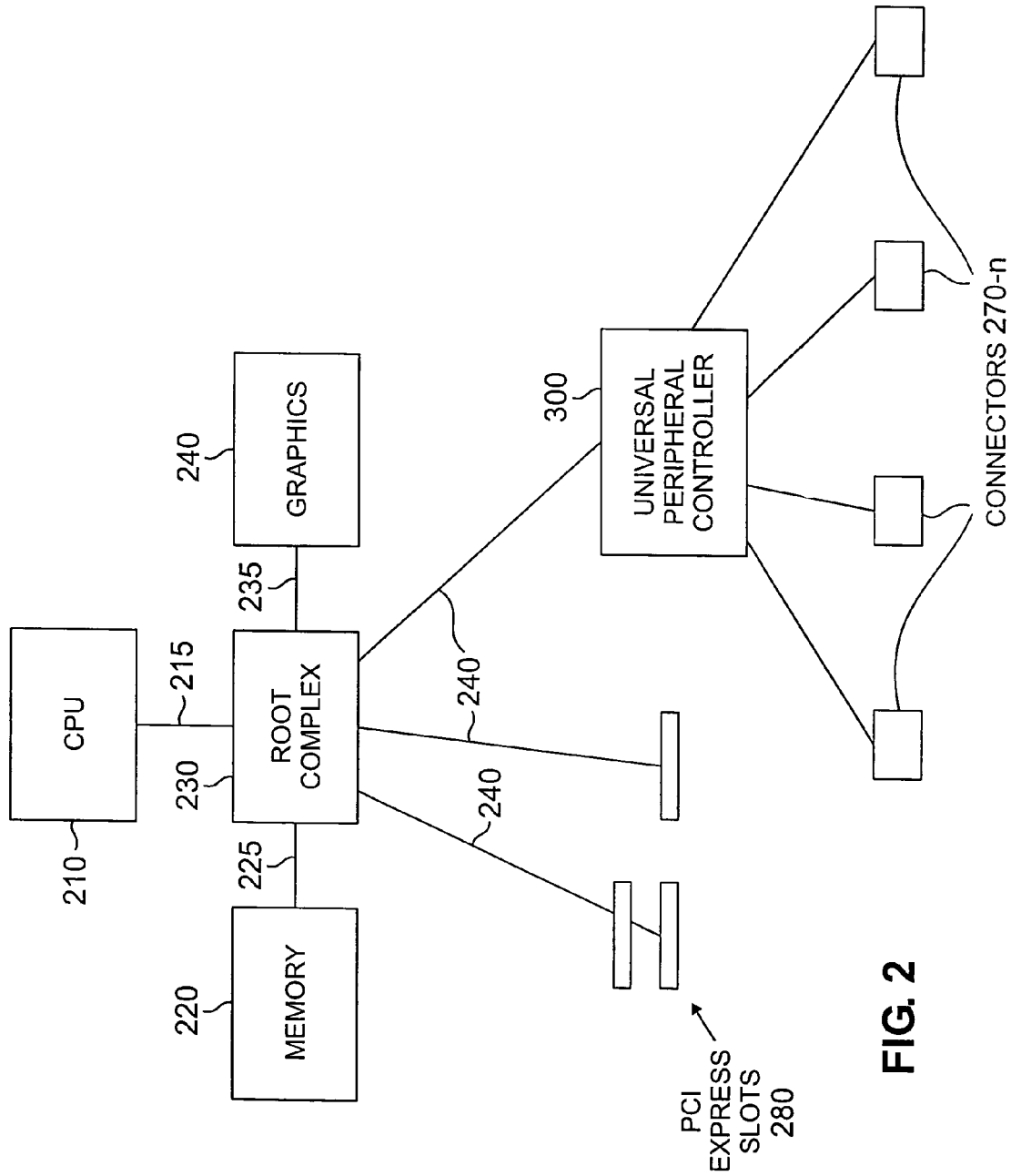
FIG. 2 is a schematic block diagram of a computer architecture incorporating features of the present invention.

FIG. 2 is a schematic block diagram of a computer architecture 200 incorporating features of the present invention. As shown in FIG. 2, the computer architecture 200 includes a processor 210, coupled to a bridge logic device 230 via a bus 215, such as a CPU bus. The bridge logic device 230 is referred to as a "root complex" but may be embodied using, for example, the "North" bridge 130 of FIG. 1. The root complex 230 is also coupled to a memory 220 via a bus 225, such as a memory bus, and to one or more graphics devices 240, via a bus 235.

According to one aspect of the present invention, the computer architecture 200 includes the universal peripheral controller 300, discussed further below in conjunction with FIG. 3. In one exemplary implementation, a PCI-Express bus 240 is employed between the root complex 230 and the universal peripheral controller 300. Among other benefits, the PCI-Express standard allows the root complex 230 to connect directly to the PCI-Express slots 280 (unlike the conventional architecture that routed such communications via the South bridge 150). Generally, with current technologies, the PCI-Express standard permits trace lengths of up to 40 inches.

As shown in FIG. 2 and discussed further below in conjunction with FIG. 3, the universal peripheral controller 300 connects directly to the peripheral connectors 270-n, without an intervening PHY interface 160. The peripheral connectors 270-n may be embodied, for example, as Ethernet connectors (such as an RJ45 connector), a wireless local area network (WLAN) connection, or USB 2.0 connectors.

Figure 3:
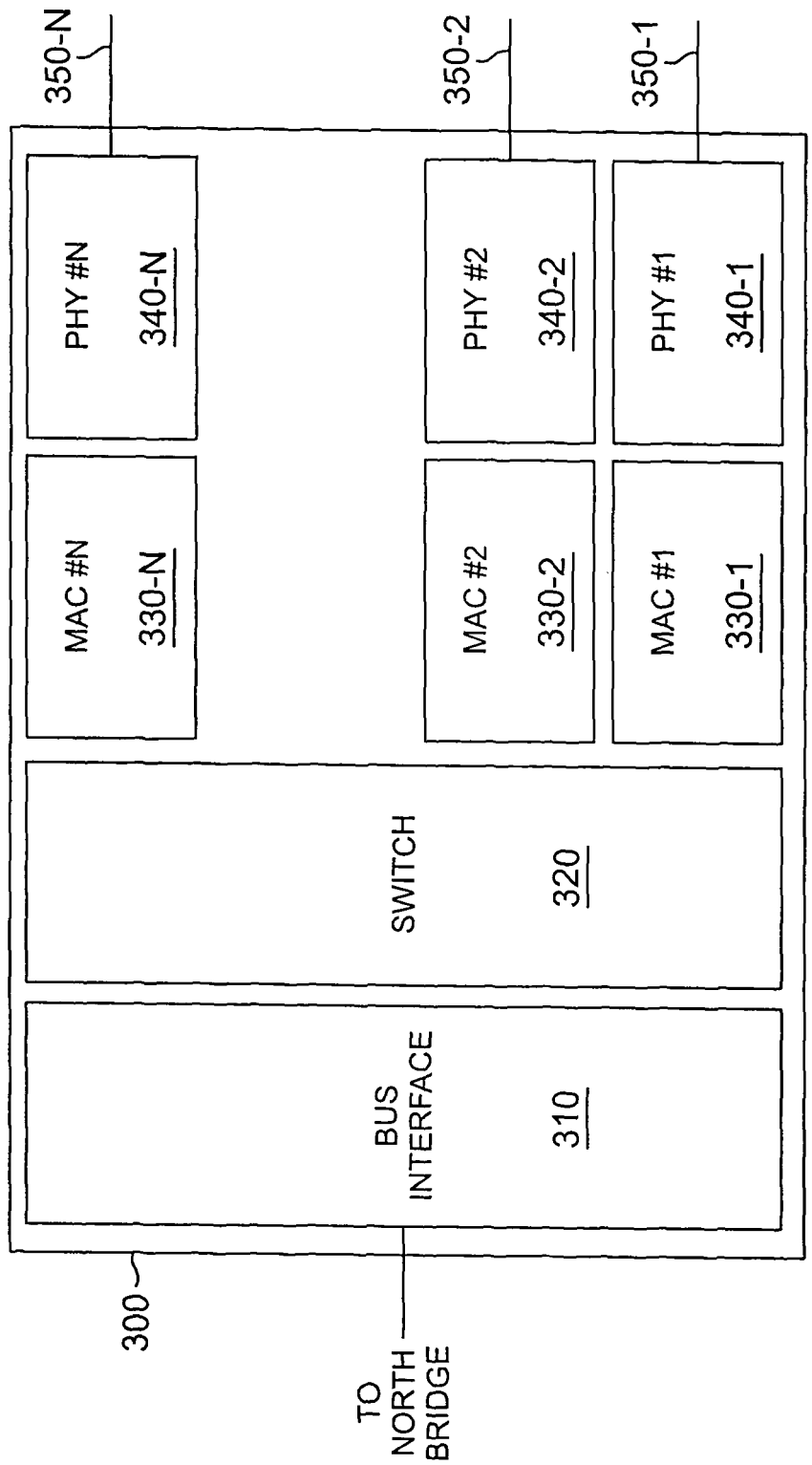
FIG. 3 is a schematic block diagram illustrating the universal peripheral controller of FIG. 2 in further detail.

FIG. 3 is a schematic block diagram illustrating the universal peripheral controller 300 of FIG. 2 in further detail. As shown in FIG. 3, the universal peripheral controller 300 includes a bus interface 310, such as a PCI-Express interface in the exemplary embodiment. In addition, the universal peripheral controller 300 includes a switch 320 for demultiplexing the serial communications on the PCI-Express bus 240 for routing to the appropriate peripheral device (not shown) via the corresponding connector 350-n.

For each supported peripheral connection, the universal peripheral controller 300 includes appropriate MAC and PHY controllers 330-n, 340-n and a peripheral connector 350-n. The MAC controllers 330 store and forward packets to and from a network, in a known manner. The PHY controllers 340 provide the electrical interface onto the network (or another connection, such as a USB or Firewire connection). It is noted that the peripheral devices that are connected to the connectors 350-n would typically include their own MAC and PHY controllers, as appropriate, in a known manner. In this manner, the universal peripheral controller 300 supports various peripheral protocols without requiring redundant PHY controllers for each peripheral device on the motherboard. In addition, the universal peripheral controller 300 exhibits reduced complexity, cost and power consumption, relative to the conventional architecture 100 of FIG. 1.

When fabricating the integrated circuits incorporating the universal peripheral controller 300 of the present invention, a plurality of identical die are typically formed in a repeated pattern on a surface of the wafer. Each die includes a universal peripheral controller device 300 described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. An integrated controller for communicating with a plurality of physical (PHY) layer peripheral devices, comprising:
    a bus interface for processing communications with a central processing unit, wherein said central processing unit is external to said integrated controller;
    a switch for routing communications between said central processing unit and one or more of said plurality of peripheral devices; and
    a plurality of Media Access Controller (MAC)/PHY controllers, each of said MAC/PHY controllers providing both MAC and PHY functions and an interface to at least one peripheral device and translating said communications into a format suitable for said at least one peripheral device such that said integrated controller supports a plurality of standards in a physical (PHY) layer, wherein said plurality of MAC/PHY controllers comprise a plurality of MAC controllers configured to support different standards simultaneously via a demultiplexer.

2. The integrated controller of claim 1, wherein at least one of said plurality of MAC/PHY controllers includes a PHY controller for a corresponding peripheral device.

3. The integrated controller of claim 2, wherein said PHY controller provides an electrical interface to a connection.

4. The integrated controller of claim 1, wherein at least one of said plurality of MAC/PHY controllers includes a MAC controller for a corresponding peripheral device.

5. The integrated controller of claim 4, wherein said MAC controller stores and forwards packets to and from a network.

6. The integrated controller of claim 1, wherein said plurality of MAC/PHY controllers translate said communications into a format suitable for said corresponding peripheral devices.

7. The integrated controller of claim 1, wherein said communications are in accordance with a PCI-Express standard.

8. The integrated controller of claim 1, wherein said bus interface provides said communications to said central processing unit via a North bridge.

9. The integrated controller of claim 1, wherein said bus interface provides said communications to said central processing unit via a South bridge.

10. The integrated controller of claim 1, wherein said integrated controller is embodied on an integrated circuit.

11. The integrated controller of claim 1, wherein said integrated controller is a System on a Chip.

12. The integrated controller of claim 1, wherein said plurality of physical (PHY) layer standards comprise one or more of Ethernet, Wireless Fidelity (WiFi), Universal Serial Bus (USB) and Firewire technologies.

13. An integrated circuit, comprising:
a bus interface for processing communications with a central processing unit, wherein said central processing unit is external to said integrated circuit:
a switch for routing communications between said central processing unit and one or more of said plurality of physical (PHY) layer peripheral devices;
a plurality of Media Access Controller (MAC)/PHY controllers, each of said MAC/PHY controllers providing both MAC and PHY functions and an interface to at least one peripheral device and translating said communications into a format suitable for said at least one peripheral device such that said integrated controller supports a plurality of physical (PHY) layer standards, wherein said plurality of MAC/PHY controllers comprise a plurality of MAC controllers configured to support different standards simultaneously via a demultiplexer.

14. The integrated circuit of claim 13, wherein at least one of said plurality of MAC/PHY controllers includes a PHY controller for a corresponding peripheral device.

15. The integrated circuit of claim 14, wherein said PHY controller provides an electrical interface to a connection.

16. The integrated circuit of claim 13, wherein at least one of said plurality of MAC/PHY controllers includes a MAC controller for a corresponding peripheral device.

17. The integrated circuit of claim 16, wherein said MAC controller stores and forwards packets to and from a network.

18. The integrated circuit of claim 13, wherein said plurality of MAC/PHY controllers translate said communications into a format suitable for said corresponding peripheral devices.

19. The integrated circuit of claim 13, wherein said communications are in accordance with a PCI-Express standard.

20. The integrated circuit of claim 13, wherein said bus interface provides said communications to said central processing unit via a North bridge.

21. The integrated circuit of claim 13, wherein said bus interface provides said communications to said central processing unit via a South bridge.

22. A method performed by an integrated device for communicating with a plurality of peripheral devices, comprising:
processing communications with a central processing unit that is external to said integrated device;
routing communications between said central processing unit and one or more of said plurality of physical (PHY) layer peripheral devices; and
providing an interface to said plurality of peripheral devices using a plurality of Media Access Controller (MAC)/PHY controllers, wherein said plurality of MAC/PHY controllers provide both MAC and PHY functions and translate said communications into a format suitable for said at least one peripheral device such that said integrated device supports a plurality of physical (PHY) layer standards, wherein said plurality of MAC/PHY controllers comprise a plurality of MAC controllers configured to support different standards simultaneously via a demultiplexer.

23. The method of claim 22, wherein said providing step is performed by a PHY controller associated with a corresponding peripheral device.

24. The method of claim 22, further comprising the step of storing and forwarding packets to and from a network.

25. The method of claim 22, wherein said providing step further comprises the step of translating said communications into a format suitable for given peripheral device.

26. The method of claim 22, wherein said communications are in accordance with a PCI-Express standard.

* * * * *